(12) United States Patent
Nanda et al.

(10) Patent No.: US 7,826,838 B1
(45) Date of Patent: Nov. 2, 2010

(54) ADAPTIVE CONTENTION FOR WIRELESS DEVICES

(75) Inventors: Sameer Nanda, Cupertino, CA (US); Naren Bhat, Fremont, CA (US); Thomas A. Maufer, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 197 days.

(21) Appl. No.: 11/556,076

(22) Filed: Nov. 2, 2006

(51) Int. Cl.
*H04J 3/22* (2006.01)
*H04W 24/00* (2009.01)
*G06F 15/173* (2006.01)

(52) U.S. Cl. ............... 455/423; 370/465; 455/425; 709/224

(58) Field of Classification Search .......... 370/328, 370/465; 455/423, 425; 709/224
See application file for complete search history.

(56) References Cited

U.S. PATENT DOCUMENTS

| | | | |
|---|---|---|---|
| 6,009,104 A * | 12/1999 | Kalkunte | 370/448 |
| 6,965,942 B1 * | 11/2005 | Young et al. | 709/232 |
| 7,159,016 B2 * | 1/2007 | Baker | 709/220 |
| 7,684,367 B2 * | 3/2010 | Yun et al. | 370/329 |
| 2002/0116490 A1 * | 8/2002 | Hogg et al. | 709/224 |
| 2005/0213579 A1 * | 9/2005 | Iyer et al. | 370/395.2 |
| 2008/0002734 A1 * | 1/2008 | Zheng et al. | 370/445 |
| 2008/0049703 A1 * | 2/2008 | Kneckt et al. | 370/342 |

\* cited by examiner

*Primary Examiner*—Kamran Afshar
*Assistant Examiner*—Munsoon Choo
(74) *Attorney, Agent, or Firm*—Patterson & Sheridan, LLP

(57) ABSTRACT

A method and apparatus for reducing a contention window range of a client device located in a wireless network is described. In one embodiment, network conditions present in the wireless network are monitored. The network conditions are subsequently utilized to determine if the wireless network is small or if traffic in the wireless network is low. Afterwards, the contention window range of the client device is reduced if either of the wireless network is small or if the traffic in the wireless network is low.

14 Claims, 2 Drawing Sheets

ADAPTIVE CONTENTION FOR WIRELESS DEVICES

BACKGROUND OF THE INVENTION

1. Field of the Invention

Embodiments of the present invention relate generally to computer networking and more specifically to adaptive contention techniques for wireless local area network devices.

2. Description of the Related Art

In wireless local area networks (WLAN), the machines in the network are oftentimes configured to begin transmitting upon detecting that the transmission medium is idle. In such a scenario, a transmitting station (STA) begins transmitting and continues doing so until it detects that the transmission is not being received by the target machine. The problem with this architecture, though, is that typically multiple STAs in the WLAN notice that the transmission medium is idle at essentially the same time and, thus, begin simultaneously transmitting over the transmission medium. Such a scenario is undesirable since the transmissions from the other STAs in the WLAN usually interfere with the transmission from a given STA. As is well-known, the machines in a LAN based on the IEEE 802.11 standard are simplex devices, meaning that the machines cannot receive a signal while they are transmitting. Therefore, since the only evidence of a failed transmission is the lack of a media access control (MAC) level acknowledgement (ACK) packet, a STA may spend an entire frame time attempting a transmission before discovering that the transmission is being blocked by the transmission of another STA in the LAN. To address this problem, in 802.11 WLANs, there exists a procedure whereby a STA desiring to transmit a signal must randomly "contend" for the transmission medium with other transmitting STAs in the WLAN.

In one instance, the aforementioned procedure comprises a binary exponential backoff procedure, which is based on an exponent known as a "contention window," usually abbreviated as CW. In 802.11g networks, the CW is a randomly generated number between 0 and 15. Alternatively, in other 802.11 networks, such as 802.11b networks, the CW is a randomly generated number between 0 and 31. In an 802.11g network, when a STA wants to transmit, it generates a CW by randomly selecting a number between 0 and 15, and this CW value is then multiplied by a slot time (e.g., 9 ms or 20 ms in) to obtain a backoff time. The STA does not attempt to transmit until the backoff time expires. In other words, the STA waits for a number of slot times to pass equal to the value of the CW before attempting to transmit. If the STA experiences a collision, then the STA is configured to temporarily cease transmitting and to increase its CW to a higher value, such as 31, and wait for the new backoff time to expire before attempting to retransmit. Since the new CW for the STA is likely greater than the CWs of the other transmitting STAs in the WLAN, the STA is less likely to experience another collision since the other STAs in the WLAN would likely transmit before the STA retransmits.

One drawback to this approach is that the current binary exponential backoff procedure is inefficient in certain scenarios. For example, the average CW for the STAs in a given network is 7.5, assuming that half of the chosen random numbers are less than 7.5 and half are greater than 7.5. This translates into an average contention backoff time of 67.5 milliseconds in a network using the 9 millisecond slot time option (i.e., 7.5 *9 ms=67.5 ms). In a small 802.11g network with only a few nodes or in a larger 802.11g network where the machines are mostly idle (resulting in few collisions), having an average backoff time of 67.5 ms may result in an excessive amount of "dead air" time, meaning that there may be large windows of time where no STAs are transmitting. Inefficiencies, such as dead time, compromise the overall performance of the wireless network.

As the foregoing illustrates, there is a need in the art for a technique to reduce backoff times for client devices in a wireless network under certain operating conditions.

SUMMARY OF THE INVENTION

One embodiment of the invention sets forth a method and apparatus for reducing a contention window range of a client device located in a wireless network. Specifically, network conditions present in the wireless network are monitored. The network conditions are subsequently utilized to determine if the wireless network is small or if traffic in the wireless network is low. Afterwards, the contention window range of the client device is reduced if either of the wireless network is small or if the traffic in the wireless network is low.

One advantage of the disclosed method provides for the reduction of the contention window range. Reducing the contention window range, especially across the various client devices on the network, decreases the backoff times of the computing device and the other machines on the network that contend for the limited transmission medium. Moreover, by reducing the backoff times, the amount of "dead air" time on the network may also be lessened, thereby increasing overall network performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
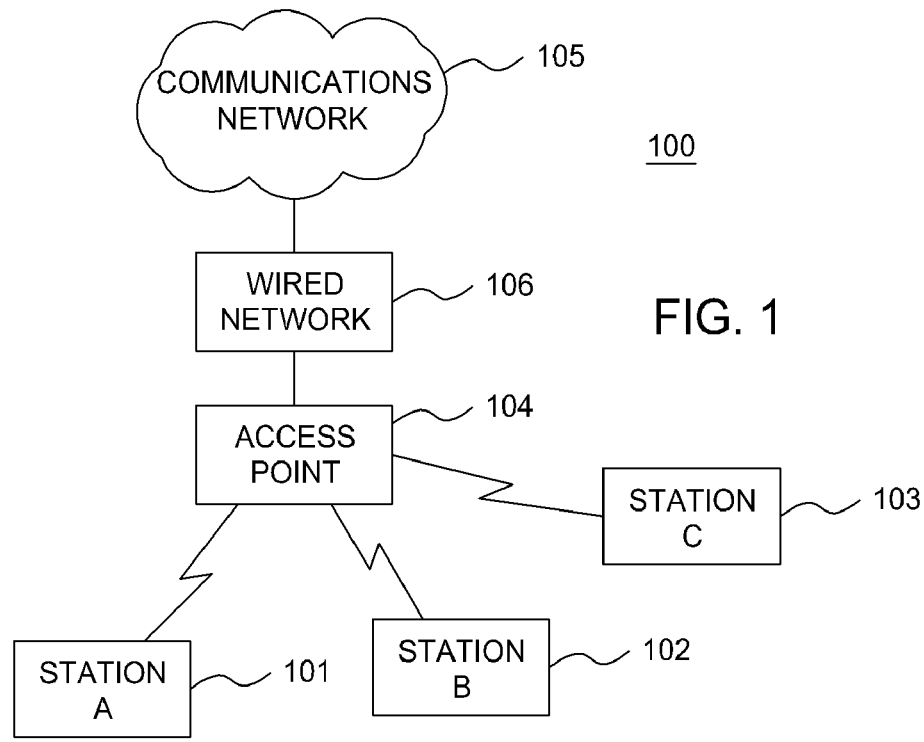
FIG. 1 is a block diagram illustrating an exemplary wireless local area network in accordance with the present invention.

FIG. 1 depicts an exemplary WLAN system 100 comprising a plurality of client stations (STAs) 101-103, an access point (AP) 104, a wired network 106, and a communications network 105 (e.g., the Internet). Each of the STAs may comprise any wireless device, including a portable laptop computer, a personal digital assistant (PDA), an IP phone, or any other device equipped with a wireless interface card. Although only three STAs are shown in FIG. 1, those skilled in the art realize that any number of STAs may be utilized by the WLAN system 100. The AP 104 comprises a base station device that connects wireless communication devices together to form a wireless network. The AP 104 is typically connected to a wired network 106 (e.g., a conventional LAN) and may be configured to relay data between the wireless STAs and any wired devices (not shown).

In one embodiment of the present invention, the STAs 101-103 are configured, either via software or application specific hardware, to adjust their respective contention windows in a manner that accommodates certain network traffic scenarios. More specifically, a STA 101 may be configured to reduce its contention window to within a "constrained range" under certain operating conditions, thereby reducing the associated backoff time. For example, the STA 101 may initially begin operating with a contention window within a standard range (e.g., 0-15 or 0-31, depending on the embodiment). The STA 101 may then monitor whether it is able to perform a threshold number of successful signal transmissions to the AP 104. At the same time, or separately, the STA 101 may also attempt to estimate how many other STAs are located in the WLAN system 100 by inspecting the delivery traffic information message (DTIM) field in the beacons sent by an access point 104 or by determining the number of STAs that transmit signals to the STA 101. Upon determining that the WLAN system 100 is "small" (i.e., having only a few STAs) and/or "clean" (where signal transmissions are occurring without collisions), the STA 101 may reduce its CW range below the standard range. In doing so, the STA 101 reduces its average backoff time. If all STAs in the WLAN system 100 are configured in a like manner, then reducing the CW range below the standard range across all STAs advantageously reduces the amount of "dead air" time in the WLAN system 100, thereby increasing overall network performance.

In one embodiment, the determination of whether the WLAN system 100 is "small" is based on a predefined threshold number of allowable STAs that may exist in the WLAN. Any number greater than the threshold indicates that the WLAN system 100 is likely too large to benefit from the STAs having a reduced contention window range. Similarly, as set forth above, the determination of whether the WLAN is "clean" is based on whether the STAs are able to transmit signals regularly without collisions. Not being able to perform the threshold number of transmissions without collisions indicates that the WLAN system 100 has too much traffic to benefit from the STAs having a reduced contention window range.

After reducing its CW range, the STA 101 may continue the monitoring process. If the WLAN system 100 remains "small" and/or "clean," then the STA 101 (and the other STAs within the WLAN system 100) may reduce their CW ranges yet again, further decreasing the "constrained range." Alternatively, as described in greater detail below, if the STA 101 determines that the WLAN system 100 no longer qualifies as "small" and/or "clean," then the STA 101 (and the other STAs within the WLAN system 100) may adjust their CW ranges back to the original standard or to some other appropriate range.

In one embodiment, the STA 101 may react to a collision by increasing its contention window range to the next larger range in accordance with the normal hierarchy of standard contention window ranges (e.g., 0-15, 0-31, 0-63, 0-127, 0-255, etc.). In other words, the STA 101 is configured to comply with the IEEE 802.11 standard and to treat any constrained contention window range as a proxy for the lowest standard range in the hierarchy. Thus, if operating under a constrained contention window range, upon detecting a collision, the STA 101 would raise the CW range to the next standard range in the hierarchy, not to the lowest standard range in the hierarchy. For example, if a STA 101 were operating with a constrained contention window range of 0-9, and the STA 101 experienced a collision, the STA 101 would increase its contention window range to 0-31, not 0-15, since 0-31 is the next highest range above the minimum standard range of 0-15. An exception to this rule would be that if the STA 101 possessed data indicating that all of the other STAs in the WLAN network 101 were capable of adjusting their CW ranges the minimum standard range, then the STAs increase their CW ranges back to the minimum standard range rather than jumping to the first "normal penalty level." The rationale for this approach is that if a STA implementing the present invention is located in a network but cannot determine if there are legacy STAs present in the network, operating under the assumption that there are legacy STAs is the most efficient network configuration. More specifically, since legacy STAs cannot implement constrained contention window ranges, the STAs implementing the present invention would have to increase their contention window ranges above the minimum standard range in the event of a collision to produce backoff times long enough to allow the legacy STAs to transmit using the minimum standard contention window range. Otherwise, the legacy STAs may never get an opportunity to transmit.

In scenarios where the STA 101 experiences collisions at a moderate rate, the STA would not reduce its contention window range to a constrained range since the rate of collisions would actually increase across the WLAN system 100 if the different STAs were decrease their contention window ranges under such a condition. Once the STA 101 successfully transmits data after experiencing a collision, the STA 101 may be permitted to reset its CW range to the minimum standard range. Upon doing so, the STA 101 may resume its observation of the "small" and/or "clean" state of the WLAN network 100. To the extent the STA 101 observes that the WLAN network 100 is "small" and/or "clean," then it may reduce its CW range to a constrained range.

Again, one advantage of reducing the CW range and backoff time in a client device is increased bandwidth and efficiency. For example, the theoretical maximum throughput for a single unidirectional UDP stream running at 54 Mbps is 30,233,633 bits per second in the scenario where the minimum contention window range is 0-15 (which on average causes an STA to wait 7.5 slot times per frame). If the contention window were to be reduced to a lower range (e.g., 0-3), then the maximum UDP throughput may be increased by over 16% to 35,099,851 bits per second.

The following are examples of how the teachings of the present invention may be implemented. As previously indicated, the lowest range of the contention window under 802.11g is typically 0-15. However, if STA 101 determines that it is not experiencing any retransmissions or other MAC-layer errors, it would be advantageous for the STA 101 to reduce its contention window range to 0-14. Furthermore, if the STA 101 continues to observe that this change does not cause any transmission problems, then the contention window range could be further reduced to 0-13. Similarly, in a small network with only two or three nodes in addition to the AP, the default minimum contention window range of 0-15 may be far too conservative, resulting in too much "dead air" time on the network. The network may be able to operate with a constrained contention window range of 0-5 or smaller. Such "small" networks are very common, especially in home networks. Due to the prevalence of small networks, the ability to reduce the contention window range aggressively when the network configuration or amount of traffic allows such a reduction, while still being able to comply with standard contention window ranges if excessive transmission errors are detected (indicative of a larger or higher-traffic network), is highly desirable. Again, such flexibility may yield substantial performance benefits since the amount of "dead air" time on the network can be reduced.

Figure 2:
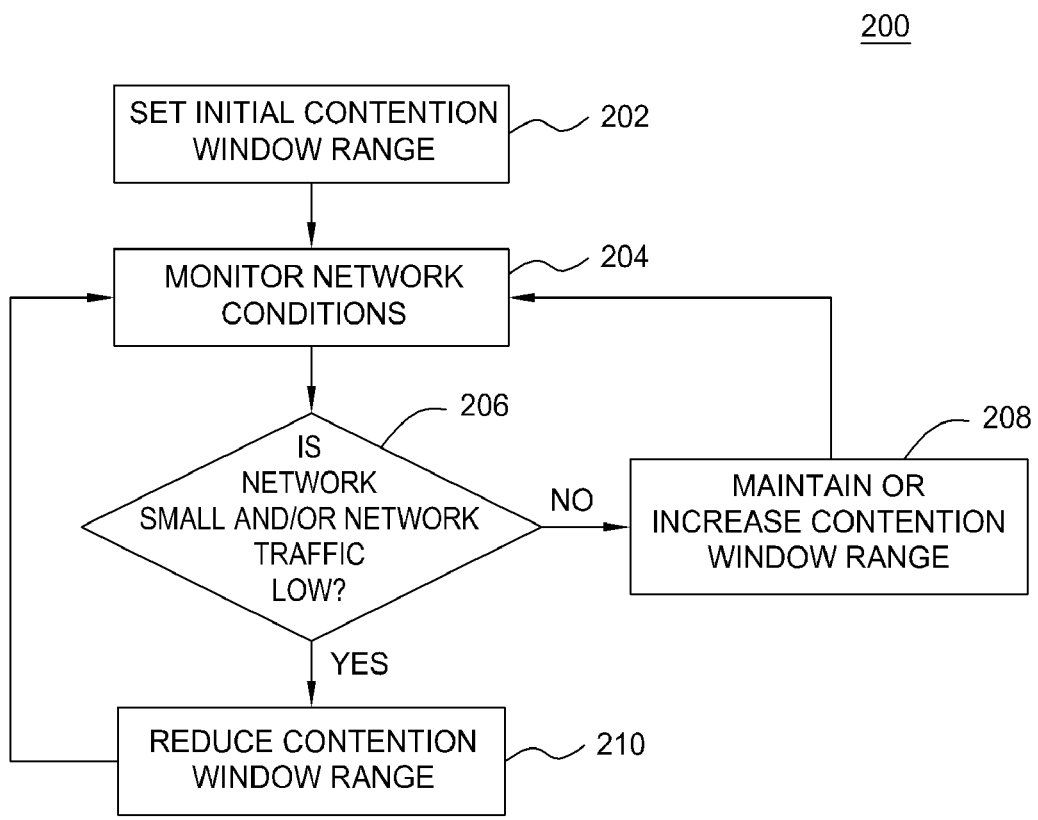
FIG. 2 is a flow diagram of method steps for reducing the contention window range for a computing device in a wireless network, according to one embodiment of the present invention.

FIG. 2 is a flow diagram of method steps for reducing the contention window range for a computing device in a wireless network, according to one embodiment of the present invention. Although the method is described in conjunction with the systems of FIGS. 1 and 3, persons skilled in the art will understand that any system configured to perform the method steps, in any order, is within the scope of the invention.

The method 200 begins at step 202, where the computing device sets an initial contention window range. As previously described herein, in an 802.11g network, the initial contention window range may be from 0-15 since this is the smallest standard contention window range. In step 204, the computing device monitors the condition of the network. For example, the computing device may be configured to observe how many machines are in the network and/or monitor how much traffic is on the network. Network traffic can be measured in any standardized or other technically feasible manner. In one embodiment, the computing device is configured to determine the frequency of collisions when attempting to transmit data over a given period of time.

In step 206, the computing device determines whether the network is "small" and/or "clean" based on the observed network conditions. In one embodiment, the network is small if the computing device determines that fewer than a threshold number of machines are in the network, and the network is clean if the computing device is able to perform a threshold number of transmissions without interference from other machines on the network. If either or both conditions exist, depending on the embodiment, the overall performance of the network may improve if the contention window range used by the computing device is reduced. Again, as previously described herein, reducing the contention window range, especially across the various machines on the network, reduces the backoff times of the computing device and the other machines on the network when contending for the transmission medium. By reducing the backoff times, the amount of "dead air" time on the network may also be reduced, thereby increasing overall network performance.

If, in step 206, the computing device determines that the conditions exist for reducing the contention window range, then the method proceeds to step 210, where the computing device reduces its contention window range. Under standard 802.11 procedures, a STA reduces its contention window range to the minimum standard range after each successful transmission. Thus, if conditions exist for reducing the contention window range in step 206, the current contention range would likely be the minimum standard range since the computing device would likely have just successfully transmitted data. Therefore, in step 210, the contention window range would be reduced to a constrained range. However, if the contention window range has already been reduced to a constrained range, and, in step 206, the conditions for reducing the contention window range still exist, then, in step 210, the contention window range would be reduced to an even smaller constrained range. In alternative embodiments, though, the current contention window range may be a standard range larger than the minimum standard range. In such case, in step 210, the contention window range would be reduced to the next smallest standard range or the minimum standard range, depending on the implementation. The method then returns to step 204.

If, however, in step 206, the computing device determines that the conditions for reducing the contention window range do not exist, then the method proceeds to step 208, where the computing device either maintains the current contention window range or increases the contention window range. As also previously described herein, if the current contention window range is a constrained range, then in step 208, the contention window range is increased to the minimum standard range. However, if the current contention window range is the smallest standard range or some other standard range, then, in step 208, the contention window range is either maintained or increased to the next largest standard range, in accordance with normal 802.11 procedures. The method then returns to step 204.

In another embodiment, the present invention may also be optimized through the AP 104, since the AP 104 keeps track of the number of STAs on the network and also can communicate with the STAs on the network. The AP 104 may include the desired value of the contention window range in its beacons, which are packets sent by the AP 104 to synchronize a wireless network. To the extent that the desired range is a constrained range, STAs on the network that are capable of reducing their contention window ranges may take advantage of the performance improvements associated with such a reduction. The AP 104 may also be used to simply advertise the current number of STAs on the network. This information could be distributed to the STAs in beacons via a proprietary information element. The STAs then could use this information to determine if the network is sufficient "small" to support a contention window range reduction.

When using the AP 104, the contention window range may be changed at the granularity of a beacon interval (typically about 100 milliseconds). Further, since the AP 104 receives all transmissions from the STAs on the network, if the AP 104 ever receives a transmission with the "retry" bit set, then the AP 104 knows that a STA experienced a collision. In such an event, or if the AP 104 itself experienced a collision and needs to retransmit a packet, the AP 104 may choose to adjust the advertised contention window range in the next beacon it transmits. The AP 104 could then gradually reduce the range, until it settles to a point where collisions are deemed to be acceptable. One possible algorithm would be to increase the range to the next power of 2, then decrease the range incrementally by one. So, for example, if the range had been 0-3, then the AP 104 would increase the advertised range to 0-7. Then the AP 104 would observe the level of collisions and, if the level is acceptable, would then drop the contention window range to 0-6.

Figure 3:
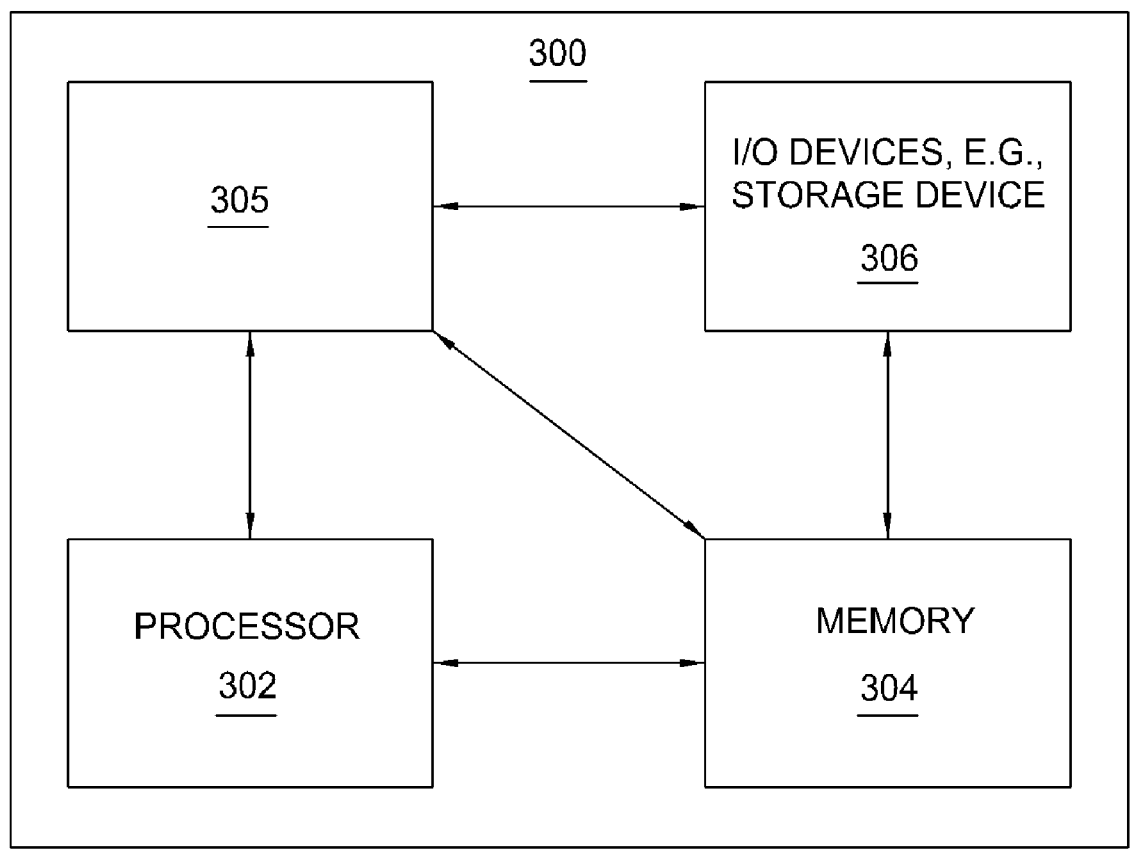
FIG. 3 a block diagram depicting an exemplary embodiment of a computer suitable for implementing the processes and methods described herein.

FIG. 3 depicts a high level block diagram of a general purpose computing device 300 suitable for use in performing the inventive functions described herein. As depicted, the computing device 300 includes, without limitation, a processor element 302 (e.g., a CPU), a memory 304, e.g., random access memory (RAM) and/or read only memory (ROM) and/or persistent memory (Flash), a contention window adjustment module 305, and input/output devices 306 (e.g., storage devices and user input devices). The contention window adjustment module 305 is configured to implement the various aspects of the present invention described herein, including, without limitation, setting an initial contention window range, monitoring network configuration and/or traffic conditions (i.e., determining whether a network is "small" and/or "clean"), reducing the contention window range to a constrained range, and increasing the contention window range to a standardized range. The contention window adjustment module 305 may be implemented in software, hardware or a combination of software and hardware. In one embodiment, the contention window adjustment module 305 can be loaded into memory 304 and executed by processor 302 to implement the functions as discussed above. As such, the contention window adjustment module 305 (including associated data structures) can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

We claim:

1. A method for establishing a contention window range for a client device located in a wireless network, the method comprising:
    operating the client device within a contention window (CW) range having a minimum standard size;
    monitoring network conditions present in said wireless network;
    estimating the number of client devices in said wireless network by determining a number of client devices that transmit signals to the client device;
    determining that said wireless network is small based on the estimated number of client devices;
    reducing the size of said contention window range of the client device to a first range that is smaller than the minimum standard size when traffic in said wireless network is low based on the network conditions, wherein said traffic in said wireless network is designated as low if a predefined threshold number of transmissions originating from said client device to an access point in said wireless network is performed without interference; and
    thereafter, upon detecting a collision, increasing the size of said CW range of the client device to a second range that is above the minimum standard size.

2. The method of claim 1, wherein the step of determining that said wireless network is small comprises determining that a predefined threshold number of client devices on said wireless network is not exceeded.

3. The method of claim 1, wherein a maximum value of the second range is computed as one less than $2^i$, where i is an integer and $2^i$ is greater than a maximum value of said contention window range.

4. The method of claim 3, further comprising decreasing the size of said CW range of the client device incrementally by one when a number of detected collisions is deemed to be acceptable.

5. The method of claim 1, further comprising:
    determining that all of the client devices in the wireless network are capable of adjusting their respective CW ranges to the minimum standard size; and
    increasing said CW range of the client device to the minimum standard size.

6. A non-transitory computer readable medium having stored thereon instructions that, when executed by a processor, causes the processor to perform a method for establishing a contention window range of a client device located in a wireless network, comprising:
    operating the client device within a contention window (CW) range having a minimum standard size;
    monitoring network conditions present in said wireless network;
    estimating the number of client devices in said wireless network by determining a number of client devices that transmit signals to the client device;
    determining that said wireless network is small based on the estimated number of client devices;
    reducing the size of said contention window range of the client device to a first range that is smaller than the minimum standard size when traffic in said wireless network is low based on the network conditions, wherein said traffic in said wireless network is designated as low if a predefined threshold number of transmissions originating from said client device to an access point in said wireless network is performed without interference; and
    thereafter, upon detecting a collision, increasing the size of said CW range of the client device to a second range that is above the minimum standard size.

7. The non-transitory computer readable medium of claim 6, wherein the step of determining that said wireless network is small comprises determining that a predefined threshold number of client devices on said wireless network is not exceeded.

8. The non-transitory computer readable medium of claim 6, wherein a maximum value of the second range is computed as one less than $2^i$, where i is an integer and $2^i$ is greater than a maximum value of said contention window range.

9. The non-transitory computer readable medium of claim 8, further comprising decreasing the size of said CW range of the client device incrementally by one when a number of detected collisions is deemed to be acceptable.

10. The non-transitory computer readable medium of claim 6, further comprising:
    determining that all of the client devices in the wireless network are capable of adjusting their respective CW ranges to the minimum standard size; and
    increasing said CW range of the client device to the minimum standard size.

11. An apparatus for reducing a contention window range of a client device located in a wireless network, comprising:
    a contention window adjustment module that is configured to:
    operate the client device within a contention window (CW) range having a minimum standard size;
    monitor network conditions present in said wireless network;
    estimate the number of client devices in said wireless network by determining a number of client devices that transmit signals to the client device;
    determine that said wireless network is small based on the estimated number of client devices;
    reduce said contention window range of said client device to a first range that is smaller than the minimum standard size when traffic in said wireless network is low based on the network conditions, wherein said traffic in said wireless network is designated as low if a predefined threshold number of transmissions originating from said client device to an access point in said wireless network is performed without interference; and
    thereafter, upon detecting a collision, increase the size of said CW range of the client device to a second range that is above the minimum standard size.

12. The apparatus of claim 11, wherein the contention window adjustment module is further configured to compute a maximum value of the second range as one less than $2^i$, where i is an integer and $2^i$ is greater than a maximum value of said contention window range.

13. The apparatus of claim 12, wherein the contention window adjustment module is further configured to decrease the size of said CW range of the client device incrementally by one when a number of detected collisions is deemed to be acceptable.

14. The apparatus of claim 11, wherein the contention window adjustment module is further configured to:

determine that all of the client devices in the wireless network are capable of adjusting their respective CW ranges to the minimum standard size; and increase said CW range of the client device to the minimum standard size.

* * * * *